(12) United States Patent
Proctor et al.

(10) Patent No.: US 7,016,353 B2
(45) Date of Patent: Mar. 21, 2006

(54) METHOD AND SYSTEM FOR DYNAMICALLY ASSIGNING IP ADDRESSES IN WIRELESS NETWORKS

(75) Inventors: Paul Proctor, Eatontown, NJ (US); Tao Zhang, Fort Lee, NJ (US)

(73) Assignees: Telcordia Technologies, Inc., Piscataway, NJ (US); Toshiba America Research, Inc., Piscataway, NJ (US)

( * ) Notice: Subject to any disclaimer, the term of this patent is extended or adjusted under 35 U.S.C. 154(b) by 1040 days.

(21) Appl. No.: 09/880,530

(22) Filed: Jun. 13, 2001

(65) Prior Publication Data

US 2003/0043781 A1 Mar. 6, 2003

(51) Int. Cl.
*H04L 12/28* (2006.01)

(52) U.S. Cl. .................. 370/392; 370/338; 370/401
(58) Field of Classification Search ............ 370/328, 370/338, 389, 390, 392, 401
See application file for complete search history.

(56) References Cited

U.S. PATENT DOCUMENTS

| | | | | |
|---|---|---|---|---|
| 5,548,586 A | * | 8/1996 | Kito et al. ............ | 370/349 |
| 6,219,715 B1 | * | 4/2001 | Ohno et al. ........... | 709/245 |
| 6,282,577 B1 | * | 8/2001 | Okanoue et al. ....... | 709/250 |
| 6,535,918 B1 | * | 3/2003 | Bender et al. ......... | 709/228 |
| 6,763,012 B1 | * | 7/2004 | Lord et al. ........... | 370/338 |
| 6,804,221 B1 | * | 10/2004 | Magret et al. ......... | 370/338 |

* cited by examiner

*Primary Examiner*—Ricky Ngo
*Assistant Examiner*—Christine Ng
(74) *Attorney, Agent, or Firm*—Joseph Giordano; James W. Falk

(57) ABSTRACT

A method is provided for IP-based wireless networks to support dynamic assignment of IP addresses to wireless mobile stations without broadcasting messages over the air and without modifications to standard IP for dynamic IP address assignment. When a mobile station enters a new cell, it sends a request to the base station for a new IP address. At the base station, DHCP proxy servers intercept and process broadcast DHCP messages so they are transmitted only to the address server and are blocked from being sent to the other base stations in the wired IP Network for broadcast to other mobile stations. When the address server creates a server-to-client message with the requested address and places it on the wired IP Network, DHCP proxy servers at the base stations convert the broadcast DHCP messages to unicast messages for transport over the air to only those mobile stations that are currently requesting new IP addresses or verifying their current IP addresses. The conversion is based on information contained in DHCP messages which passed through the base stations.

16 Claims, 6 Drawing Sheets

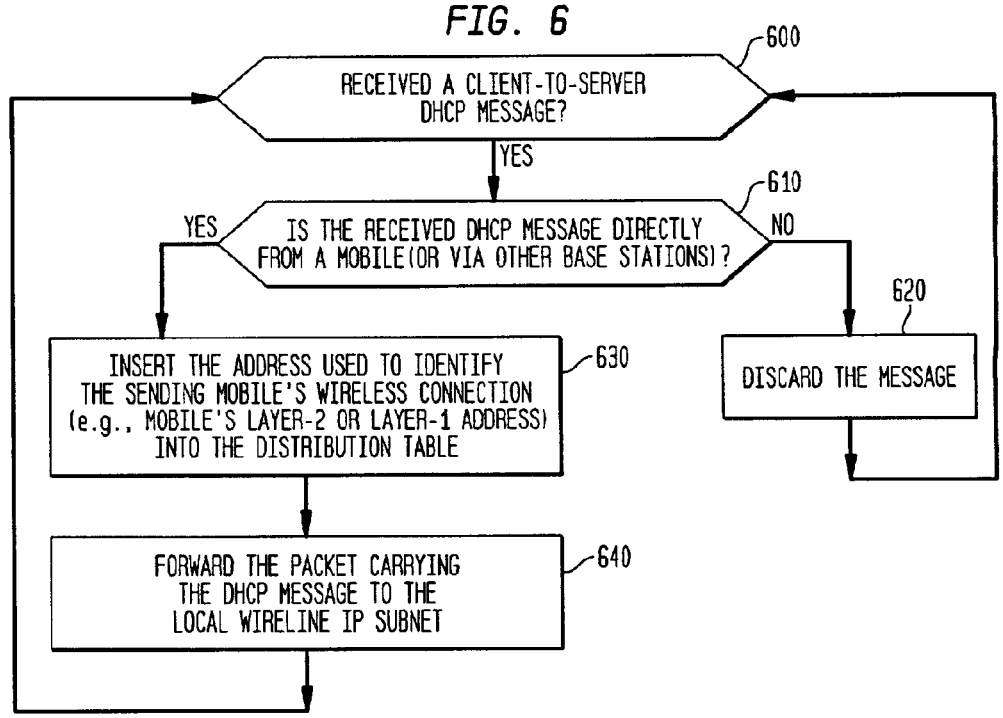
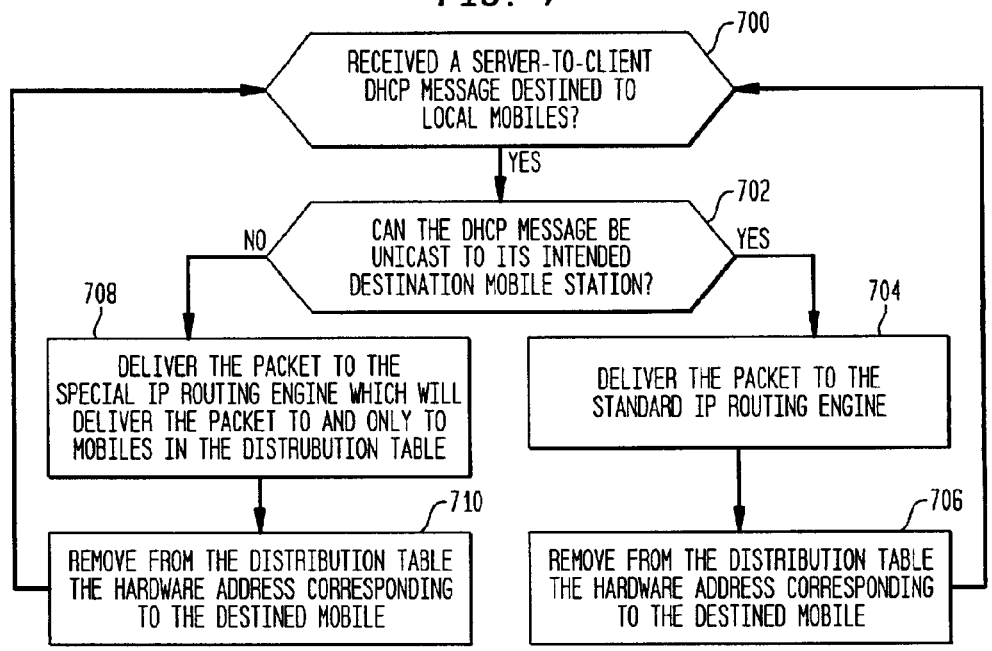

METHOD AND SYSTEM FOR DYNAMICALLY ASSIGNING IP ADDRESSES IN WIRELESS NETWORKS

BACKGROUND OF THE INVENTION

1. Field of the Invention

The present invention generally relates to the field of wireless Internet Protocol ("IP") networks, methods and protocols in personal communication systems (PCS) and, more particularly, to a method and system for dynamically assigning IP addresses in wireless networks without broadcasting over open air.

2. Description of the Related Art

Emerging IP (Internet Protocol) based wireless networks use IP protocols for transport and control of data and/or voice over open air and over wired IP networks. As a result, mobile stations utilizing the IP networks are required to dynamically obtain IP addresses when the mobile stations move into new IP subnets. Using conventional dynamic IP address allocation mechanisms (e.g., Dynamic Host Configuration Protocol or DHCP), mobile stations and IP address servers (e.g., the DHCP servers) are often required to broadcast IP packets over a wide area.

For example, when a mobile station first enters a new IP subnet, typically it does not possess the address of the IP address servers of the new IP subnet. Therefore, the mobile station usually broadcasts packets to the DHCP server of the new IP subnet to request assignment of new IP addresses. These packets contain IP broadcast addresses as their IP destination addresses and are sent by standard IP network devices to every IP host on the IP subnet, including all the wireless IP hosts. For example, if N cells are supported by the same IP subnet, these DHCP messages would be broadcast to all wireless IP hosts in all the N cells. This wide area broadcast is a waste of scarce wireless resources.

FIG. 1 is a schematic block diagram which illustrates unnecessary broadcasting of DHCP messages to mobile stations in a conventional wired IP Network or subnet. Here, mobile station A is shown as having recently entered a new cell 50 which is served by base station 3 (BS3). All mobile stations served by all the base stations BS1, BS2, BS3 (shown in FIG. 1) belong to the same IP subnet 20.

By moving into a new cell 50, mobile station A may change subnet and hence be required to request a new address. When mobile station A recognizes that it has moved into a new cell, it uses standard DHCP procedures to validate its current IP address and/or request a new IP address, if necessary. An exemplary simplified standard procedure for a mobile station to use DHCP to obtain a new IP address or to verify its current IP address is:

(1) The mobile station broadcasts a DHCPDISCOVER message on a local IP subnet in a broadcasted IP packet (i.e., a packet containing a broadcast destination IP address). Here, the mobile station may include options where values for its IP address are suggested, such as its current IP address; and (2) a DHCP server responds with a DHCPOFFER message upon receiving the DHCPDISCOVER message. The DHCPDISCOVER message will contain the IP address assigned to the mobile station. The DHCP servers may also broadcast the DHCPOFFER messages back to the clients.

A mobile station may receive multiple DHCPOFFER messages from multiple servers. Therefore, after receiving such DHCPOFFER messages, the mobile station broadcasts a DHCPREQUEST message back to the servers. The DHCPREQUEST message may also be used to acknowledge acceptance of an address assigned by a particular server to a mobile station, and to decline offers from other servers.

Using the previously described conventional DHCP and standard IP network devices, all the DHCP messages broadcast from a requesting mobile device and the DHCP servers are routed to every mobile station on the same IP subnet serving the requesting mobile station. Broadcasting IP packets in this manner to all mobile stations in a "common" IP subnet wastes scarce, valuable resources in the wireless network and consumes power within the mobile stations, since no other mobile station in the IP subnet needs to receive the transmitted IP packets.

This waste becomes an acute problem when PPP (point-to-point protocol) is used to support IP transport of packets over Code Division Multiple Access (CDMA) networks (e.g., as suggested by the Third Generation Partnership Project II or 3GPP2). Specifically, when PPP is used, base stations are required to send a separate copy of the broadcast packet to each mobile station, which can lead to even more unnecessary signaling traffic over the air.

In computer-related networking or telecommunications, the point-to-point protocol is used for communicating information between a source and a destination over a point-to-point link. PPP is widely used for transmitting Transmission Control Protocol/Internet Protocol (TCP/IP) packets over dial-up telephone connections, such as between a general purpose computer and an Internet Service Provider (ISP). TCP/IP is a set of protocols developed by the United States Department of Defense for communications over interconnected, sometimes dissimilar, networks and has become the de facto standard for data communications over various networks, including the Internet. The point-to-point protocol provides a standard methodology for transporting multi-protocol datagrams of information over point-to-point links. PPP comprises three main components: (1) a methodology for encapsulating multi-protocol datagrams, (2) a link control protocol (LCP) for establishing, configuring and testing the data link connection, and (3) a family of network control protocols (NCPs) for establishing and configuring different network-layer protocols.

An end-user sets up a PPP session between the source, e.g., a general purpose computer or telecommunication device, and a destination (which can also be a general purpose computer or telecommunication device) for transmitting data or information thereto. In a PPP session, once the initial negotiation phases are successfully completed, a session identifier is associated with the connection, thereby identifying the PPP session. Typically, a single PPP connection exists between an end user's computer and the destination, e.g., an Internet service provider (ISP) or another computer connected to the Internet. The PPP session is closed when the end-user of the network system completes the data or information transfer.

A PPP (point-to-point protocol) packet or frame consists of the user data and any headers of other protocols being encapsulated by the PPP. The frame is also provided with a PPP header. The PPP header contains the information necessary to identify and maintain an associated PPP session.

Encapsulation in PPP treats a collection of structured information as a single entity without affecting or taking notice of its internal structure. Thus, a message or packet constructed according to one protocol (such as a TCP/IP packet) may be taken with its formatting data as an undifferentiated stream of bits that is then broken up and packaged according to the higher level point-to-point protocol to be sent over a particular network.

Code Division Multiple Access (CDMA) broadcast channels (e.g., the paging channel) can also be used to transmit IP packets. However, conventional broadcast channels used in CDMA networks are typically not designed for such time-sensitive traffic, and no mechanism or standard is currently available for carrying IP packets over such CDMA broadcast channels. Accordingly, there is a need for a method for supporting dynamic IP address assignment without over the air broadcasting messages of the protocol used for address assignments.

SUMMARY OF THE INVENTION

The invention is directed to a method and a system for IP-based wireless networks to support dynamic assignment of IP addresses to wireless mobile stations without broadcasting messages over the air and without modifications to standard IP for dynamic IP address assignment. According to the invention, each base station converts broadcast DHCP messages to unicast messages for transport over the air to only those mobiles that are currently requesting new IP addresses or verifying their current IP addresses. The conversion is based on information contained in the DHCP messages which pass through the base stations and is implemented in DHCP proxy servers located at each base station.

The DHCP proxy servers at the base stations intercept and process broadcast DHCP messages to block client-to-server DHCP messages from being sent to mobile stations, and to convert server-to-client DHCP messages broadcast from DHCP servers into unicast IP packets for transport over the air to only those mobile stations which are requesting new IP addresses or verifying their current IP addresses (a message is unicast by sending it once through a single wireless channel to a single mobile station).

Client-to-server DHCP messages transmitted over a wired IP Network or subnet are used to request and designate the address which is to be used to identify the wireless connection of the transmitting mobile station (e.g., the layer-2 or layer 1 address of the mobile station). These messages are inserted into a Distribution Table which provides a list of identifiers used to designate which mobile stations are requesting IP addresses or to verify existing IP addresses. Upon entry of a mobile station into a new cell, the mobile station sends a DHCPDISCOVER message in a broadcast IP packet. Instead of forwarding the DHCP message to all mobile stations, however, other base stations discard the broadcast IP packet prior to forwarding it to other mobile stations which may be accessing local subnets by determining whether the source address of the broadcast IP packet contains all zeros or whether a specific field in the DHCP message, known as the "hops" field, is zero. The hops field identifies the number of additional hops that a packet is allowed.

Server-to-client DHCP messages transmitted over a wired IP Network or subnet are only forwarded to mobile stations which are actively requesting new IP addresses. When none of the mobile stations currently served by a base station is requesting a new IP address (or verifying its current IP address), the base station will discard all server-to-client DHCP messages forwarded to it from other base stations.

By dynamically assigning addresses to mobile stations in a wireless network, valuable system resources are conserved, independent development of radio and IP components of a wireless network is facilitated, and client-to-server broadcast DHCP messages are prevented from being sent to mobile devices. In addition, IP-based wireless base stations convert server-to-client broadcast DHCP messages to unicast messages for transport over the air to only mobiles which are either requesting new IP addresses or verifying their current IP addresses. Further, standard operations of DHCP are supported without having to broadcast DHCP messages over the air.

BRIEF DESCRIPTION OF THE DRAWINGS

The foregoing and other advantages and features of the invention will become more apparent from the detailed description of the preferred embodiments of the invention given below with reference to the accompanying drawings in which:

FIG. 6 is a flow chart illustrating an embodiment of the method of the invention which is implemented by base stations to process received client-to-server DHCP messages in accordance with the invention; and FIG. 7 is a flow chart illustrating an embodiment of the method of the invention which is implemented by the base stations to process received server-to-client DHCP messages in accordance with the invention.

DETAILED DESCRIPTION OF EXEMPLARY EMBODIMENTS

Figure 1:
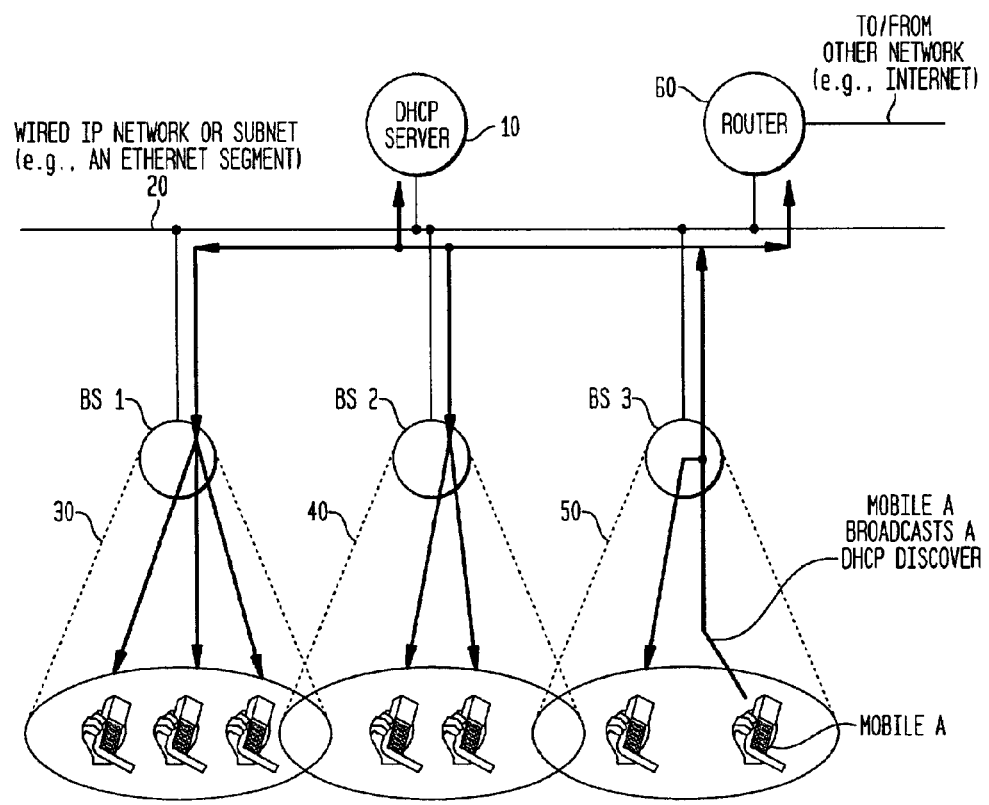
FIG. 1 is a schematic block diagram which illustrates unnecessary broadcasting of DHCP messages to mobile stations in a conventional wired IP Network or subnet.
Figure 2:
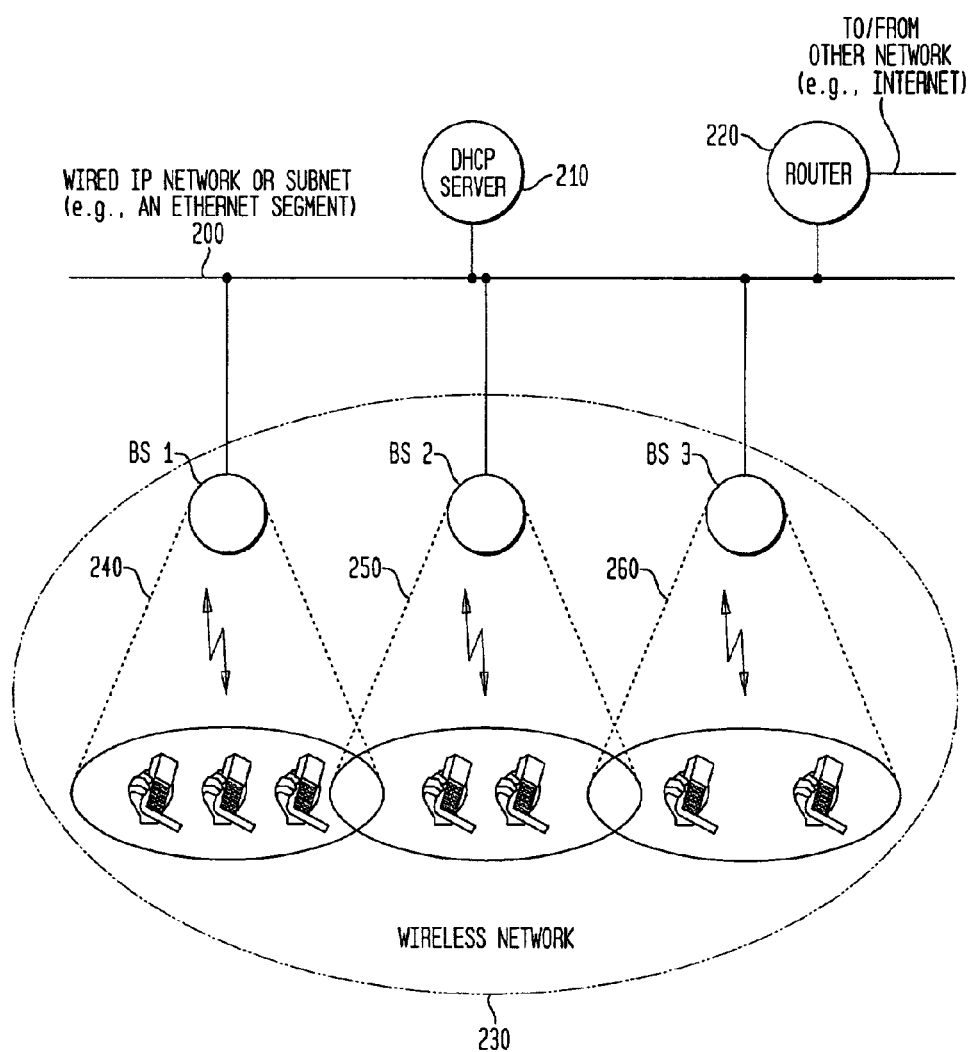
FIG. 2 is a schematic block diagram of an exemplary wired IP Network or subnet in which the method of the invention is implemented.

FIG. 2 is a schematic block diagram of a wired IP Network 200 or subnet in which the method of the invention is implemented. The exemplary network shown in FIG. 2 includes a DHCP server 210 which is directly connected to the wired IP network 200. Alternatively, the DHCP servers may be indirectly connected to the local subnet. A router 220 is provided for connecting additional networks, such as the Internet, to the IP Network 200 or subnet. The IP network 200 further includes cells 240, 250, 260 which are each served by a respective base station BS1, BS2, BS3 which are resident in wireless network 230. Naturally, it will be appreciated that the wireless network 230 can include more or less than the specific number of cells and base stations illustrated.

Figure 3:
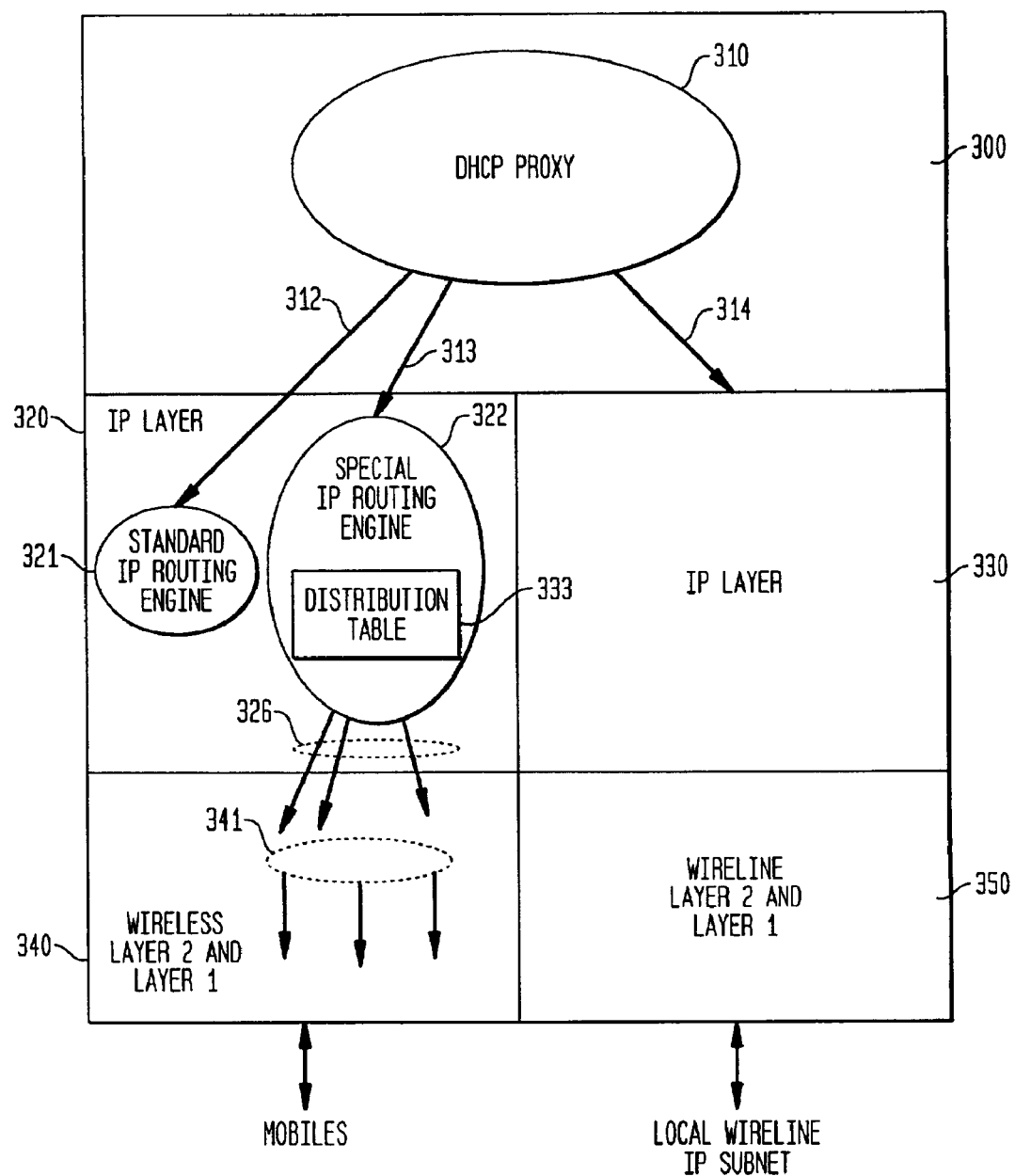
FIG. 3 is an exemplary diagram of a protocol stack of a base station configured in accordance with the present invention.

The base station architecture in accordance with this illustrative embodiment of the invention utilizes a protocol stack 300 as shown in FIG. 3. Specifically, a DHCP proxy server 310, which preforms an application process, resides in the protocol stack 300 above a first IP layer and provides communications with mobile stations and a second IP layer 330 that provides communications with wireline stations. A dynamic host configuration protocol (DHCP) that can be unicast to a mobile station is communicated over path 312 to a standard IP routing engine or server 321 in IP layer 320.

DHCP messages to and from the DHCP server 310 for local wireline stations are communicated from DHCP proxy server 310 over path 314 to the IP layer 330.

In accordance with one aspect of the invention, DHCP messages that cannot be unicast directly to a mobile station are communicated over path 313 to a special IP routing engine or server 322 that manages a Distribution Table 333. As noted above, the Distribution Table 333 is a mapping table which maintains a list of addresses which identify wireless channels to identify the mobile stations which are requesting IP addresses or verifying existing IP addresses. Packets carrying DHCP messages are thus sent from the special routing engine 322 over paths 326 to radio channels 341 in a wireless layer 340, i.e., Layer 1 or Layer 2. These messages are in turn transmitted to the mobile stations that are verifying or requesting IP addresses. The addresses maintained in the Distribution Table 333 thus can be, for example, Layer 1 and Layer 2 addresses of the mobile stations.

The Distribution Table 333 is used by the base station to distribute DHCP messages to a destination mobile station. The DHCP proxy server 310 determines whether a DHCP message can be unicast to the destination mobile station (a message is unicast by sending it once through a single wireless channel to a single mobile station). If the DHCP message can be unicast to the destination mobile station, the DHCP proxy places the DHCP message into an IP packet and the destination IP address is set to a unicast address for the destination mobile station. The IP packet containing the DHCP message is sent to the Standard IP routing engine 321. The unicast standard IP routing engine 321 performs a process which is used to determine where to forward the broadcast IP packets. The standard IP routing engine 321 also delivers the IP packet over a specific wireless channel 341 to the destination mobile station.

If, on the other hand, a DHCP message cannot be unicast to a mobile station, i.e., the DHCP proxy cannot determine a specific destination mobile station to receive a unicast DHCP message, then the DHCP proxy 310 places the DHCP message into an IP packet which contains a broadcast IP destination address and sends the packet to the special IP routing engine 322, in which the Distribution Table 333 is maintained. The special IP layer routing engine 322 performs a process which accesses the Distribution Table 333 to determine the address to send the IP packet, as discussed above. In particular, to the mobile stations identified by the Distribution Table 360 which are requesting IP addresses or verifying existing IP addresses.

In the case of communications with a wireline IP subnet, use is made of IP layer 330, which is a standard layer implementation protocol. Messages from IP layer 330 pass to wire line layers 350, i.e., wire line Layer 1 and wire line Layer 2, and from there to the local wireline IP subnet.

Figure 4:
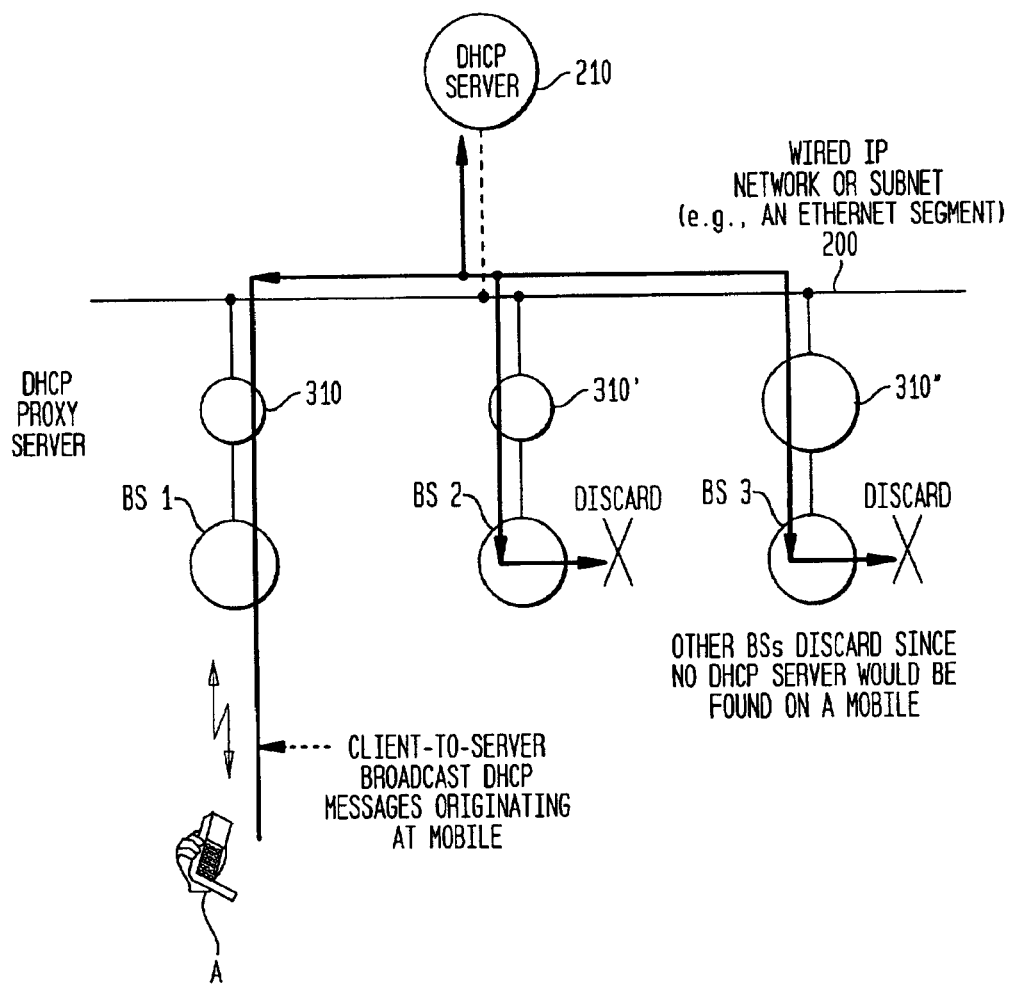
FIG. 4 is a diagram which illustrates the processing of client-to-server DHCP messages by base stations configured in accordance with the protocol stack shown in FIG. 3.

FIG. 4 is a diagram which illustrates the processing of client-to-server DHCP messages by base stations configured in accordance with the protocol stack shown in FIG. 3. Here, received client-to-server DHCP messages transmitted over the air from the mobile stations designate whether the address used to identify the wireless connection of the transmitting mobile station (e.g., the layer-2 or layer 1 address of the mobile station) is to be inserted into the Distribution Table 333 shown in FIG. 3.

To intercept the DHCP messages, which are passed through a base station for processing, a DHCP proxy server 310 is operated on conventional User Datagram Protocol (UDP) ports allocated for DHCP clients and servers. Every client-to-server DHCP message is automatically intercepted by a local DHCP proxy server 310 (i.e., the proxy on the local base station) because these IP packets contain a broadcast IP destination address and use conventional DHCP server UDPs. (Similarly, every server-to-client DHCP message is automatically intercepted by the local client proxy.) On the other hand, unicast DHCP messages are passed through the base station without being processed by a DHCP proxy.

Using the "hops" field in the DHCP message, the DHCP proxy server 310 determines whether a client-to-server DHCP message originated directly from a mobile or from another DHCP proxy server. DHCP protocol requires the DHCP clients to set the "hops" field to zero when sending client-to-server DHCP messages. Each DHCP proxy server checks the "hops" field in each client-to-server DHCP message received. If the value in the "hops" field is zero, the message is directly from a mobile station. In such a case, the DHCP proxy server 310 sets the value of the "hops" field to 1, and broadcasts the messages on the local wired IP network 200 which connects the base stations to the network.

The other DHCP proxy servers 310', 310" discard any client-to-server DHCP messages received from DHCP proxy server 310. These other servers 310', 310" receive client-to-server DHCP messages from DHCP proxy servers 310 only when such messages are broadcast by the originating DHCP proxy server 310 to the local IP subnet 200 that connects the proxies (i.e., the base stations). These DHCP messages (packets) are not intended for the mobile stations, but instead are intended for the DHCP servers 210. In other words, if a base station receives a DHCP message and determines on the bases of the "Hops" field that this message is from another base station, rather than directly from another mobile station, then the base station will discard the received DHCP message. If a DHCP message (broadcast IP packet) contains all zeros or has a "Hops" field which is zero, then it is a message which has originated from a mobile station. If the "Hops" field is set to "1", it is from another base station and should be discarded.

Upon entry of a mobile station into a new cell, i.e., the cell of base station BS1, the mobile station sends a DHCPDISCOVER message in a broadcast IP packet. Since this message will have a "Hops" field of zero, the DHCP Proxy 310 changes the "Hops" field to 1 and sends the request out over the wired IP Network or subnet 200. The DHCP Server 210 receives and interprets the request. Also, the other base stations, i.e., BS2 and BS3, receive it. However, the DHCP Proxies 310' and 310" see that the "Hops" field is 1, and instead of sending it on to the mobile stations, they discard it. In this manner, DHCP messages broadcast from the mobile stations will never be sent to other mobile stations.

Figure 5:
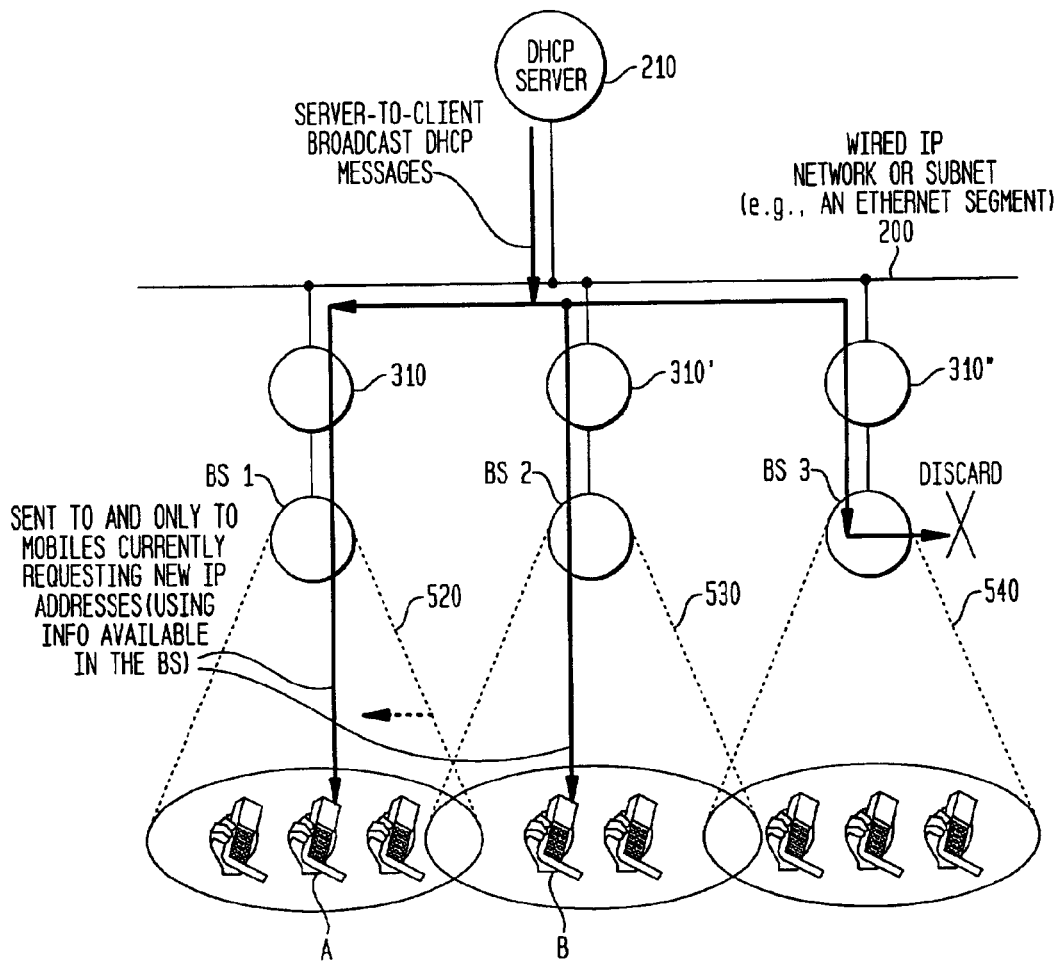
FIG. 5 is a diagram which illustrates the processing of server-to-client DHCP messages by base stations configured in accordance with the protocol stack shown in FIG. 3.

FIG. 5 is a diagram which illustrates the processing of server-to-client DHCP messages by base stations configured in accordance with the protocol stack shown in FIG. 3. In particular, FIG. 5 shows the path by which DHCP Server 210 sends address information to the requesting mobile stations. Here, server-to-client DHCP messages transmitted over the wired IP Network or subnet 200 are only forwarded to mobile stations which are actively requesting new IP addresses. Upon entry of a mobile station (e.g., A and/or B) into a new cell (e.g., 520 and/or 530, respectively), the mobile station sends a DHCPDISCOVER message in a broadcast IP packet as described above with respect to FIG. 4. In response, the DHCP Server generates an IP address message which it applies to wired IP Network or subnet 200. Instead of all base stations accepting any forwarded server-to-client DHCP messages and broadcasting them to the mobile stations, only the base stations BS1 and BS2, which are receiving DHCPDISCOVER messages in broadcast IP packets, operate to relay the server-to-client message. If a base station such as BS1 is not receiving such a message, it discards the forwarded server-to-client DHCP messages. This determination is made by the DHCP Proxy servers 310, 310' and 310" at each of the base stations.

Specifically, DHCP servers are often required to broadcast responses to IP hosts. These include messages, such as a DHCPOFFER message, a DHCPACK message and a DHCPNAK message. The server-to-client messages broadcast from DHCP servers 210 are intercepted by the DHCP client proxy 310 at each base station on the IP subnet 200 because packets carrying the server-to-client messages contain an IP broadcast destination address and are addressed to a Universal Data Port (UDP) which is assigned to DHCP clients.

Generally, it is impossible for a client proxy to determine the valid IP address for a mobile station by only reading the server-to-client DHCP messages. For example, the assigned IP address contained in the DHCPOFFER message may be simultaneously assigned to multiple hosts by the DHCP server. This means that packets sent to the assigned IP address contained in the DHCPOFFER message may be routed to any one of the mobile stations which are assigned to the same IP address. Accordingly, to permit a client proxy to convert each server-to-client DHCP broadcast message into unicast messages destined to only mobile stations which are in the process of obtaining new IP addresses or verifying their current IP addresses, each base station uses the special IP routing engine 322 and the Distribution Table 333 shown in FIG. 3 to determine which mobile stations should be sent the packet. This Distribution Table maintains a set R of mobile stations in a local cell which are currently requesting or verifying IP addresses. The special IP routing engine maps the IP broadcast to all hardware addresses of the mobile stations in set R. The DHCP proxy 310 in FIG. 5 sends each server-to-client DHCP broadcast message only to the mobile stations in set R. Relative to the total number of mobile stations served by each base station, the number of mobile stations in set R is typically very small. As a result, packets sent to mobile stations contained in set R may be delivered over point-to-point radio channels without incurring unreasonable over-the-air system "overhead" expenditures.

In accordance with the invention, a Distribution Table 333 is built and maintained by using the DHCP proxy server shown in FIG. 3 to insert a hardware address of a mobile station into the Distribution Table 333 when a client-to-server DHCP message from a mobile station is received by the DHCP proxy server. In preferred embodiments of the invention, every client-to-server DHCP message contains the hardware address of the client.

The DHCP proxy is used to remove the hardware address of the mobile station from the Distribution Table 333 when the base station receives a DHCPOFFER message, a DHCPACK message, a DHCPNAK message for the mobile station, or after the expiration of a predetermined time interval. The DHCP proxy server does not have to wait for the mobile station to confirm acceptance of an offered IP address before removing the hardware address of the mobile station from the Distribution Table 333. This is because if the mobile station rejects all the offered IP addresses, the mobile station either re-requests a new IP address, or ceases to request new IP addresses. In each case, it is safe for the proxy to remove the mobile's hardware address from the mapping table. In the first case, the mobile's hardware address will be inserted into the mapping table again when the mobile sends a new client-to-server DHCP message. In the second case, the mobile station's hardware address no longer needs to be in the Distribution Table.

FIG. 6 is a flow chart illustrating and embodiment of the method of the invention. Upon receipt of a client-to-server DHCP message (step 600), a test is performed to determine whether the received message is directly from a mobile station or via other base stations (step 610). If the received message is not directly from a mobile station, then the DHCP message is discarded (step 620), and a return to step 600 occurs to await receipt of additional DHCP messages.

On the other hand, if the received message is directly from a mobile station, then an address used to identify the wireless connection of the transmitting mobile station (e.g., the Layer-2 or Layer 1 address of the mobile station) is inserted into a Distribution Table 333 which is resident in the base station associated with the respective mobile station (step 630). The DHCP message is then forwarded to the local wireline IP subnet (step 640), and a return to step 600 occurs to await the receipt of additional DHCP messages.

FIG. 7 is flow chart illustrating the method of the invention which is implemented by base stations to process received server-to-client DHCP messages in accordance with one illustrative embodiment of the invention. Upon receipt of a server-to-client DHCP message destined for a local mobile (step 700), a determination is then made (step 702) as to whether the DHCP message can be unicast to its intended destination mobile station. If the DHCP message can be unicast, then the packet is delivered (step 704) to the standard routing engine 321. After sending the message to the mobile station, the DHCP proxy removes the corresponding mobile's hardwave address from the Distribution Table (step 706), and a return is made to step 700 to await receipt of further DHCP messages. However, if the DHCP message can not be unicast to its intended destination mobile station, then the packet is delivered (step 708) to the special IP routing engine 322 which will deliver the packet to, and only to, mobile stations identified in its Distribution Table 333. Again the hardwave address corresponding to the destined mobile is removed from the Distribution Terminal (step 710), a return is then made back to step 700 for further DHCP messages.

The method of the invention provides dynamic assignment of addresses to mobile stations in a wireless network. As a result, valuable system resources are conserved, independent development of radio and IP components of a wireless network is facilitated, and client-to-server broadcast DHCP messages are prevented from being sent to mobile devices. In addition, IP-based wireless base stations convert server-to-client broadcast DHCP messages to unicast messages for transport over the air to only those mobiles which are either requesting new IP addresses or verifying their current IP addresses. Further, standard operations of DHCP are supported without having to broadcast DHCP messages over the air.

Although the invention has been described and illustrated in detail, it is to be understood that the same is by way of illustration and example, and is not to be taken by way of limitation. In addition, it should be understood that DHCPs are an exemplary protocol for dynamic IP address assignment and that the invention is applicable to other protocols for dynamic address assignment. Moreover, the spirit and scope of the present invention are to be limited only by the terms of the appended claims.

What is claimed is:

1. A system for dynamically assigning IP addresses to mobile stations in wireless networks including a plurality of base stations and operating according to a Dynamic Host Configuration Protocol (DHCP) said system comprising:
   a wired IP network connecting the base stations;
   an address server connected to the wired IP network; and
   a proxy server at each base station in the wired network,
      said proxy server intercepting client-to-server requests for an IP address and modifying the request so that it goes only to the address server, and not to other base stations, and intercepting server-to-client IP address messages from the address server and making sure that they are unicast only to the mobile stations requesting IP addresses and wherein the proxy server changes a hops field in a received DHCP client-to-server message so that the address server processes the message, but the proxy servers at other base stations discard the message.

2. The system of claim 1 wherein the hops field is set to zero if the message is from a mobile station and the proxy server changes it to a one when sending it on the wired IP network.

3. A system for dynamically assigning IP addresses to mobile stations in wireless networks including a plurality of base stations, said system comprising:

a wired IP network connecting to the base stations;

an address server connected to the wired IP network; and a proxy server at each base station in the wired IP network, said proxy server intercepting client-to-server requests for an IP address and modifying the request so that it goes only to the address server, and not to the other base stations, and intercepting server-to-client IP address messages from the address server and making sure that they are unicast only to the mobile stations requesting IP address and wherein the proxy server further includes a distribution table which stores information about mobile stations requesting IP addresses and sends server-to-client messages only to mobile stations listed in the table.

4. The system of claim 3 wherein the server-to-client message is unicast.

5. A method of dynamically assigning IP addresses to mobile stations in wireless networks including a plurality of base stations, comprising the steps of:

receiving at a base station proxy server an address request message from a mobile station requesting an address;

determining if the address request message is directly from the mobile station or from another base station over a wired network segment;

if the address request is directly from a mobile station, altering the address request message and sending it over the wired network segment to an address server;

if the address request message is from another base station, discarding the address request message;

receiving at a base station proxy server an address designation message;

determining from a Distribution Table which mobile stations within the range of the base station have requested address information; and transmitting the address designation message containing an assigned IP address only to those mobile stations identified.

6. The method of claim 5 wherein the step of transmitting is by unicasting.

7. The method of claim 5 wherein the wireless network is operating according to a Dynamic Host Configuration Protocol (DHCP) and wherein the step of altering the address request message comprises the step of changing a hops field in a received DHCP client-to-server message so that the address server processes the message, but the proxy servers at other base stations discard the message.

8. A system for dynamically assigning IP addresses to mobile stations in a wireless network, said system comprising:

a plurality of base stations each of which serves a respective cell, each of said base stations including a dynamic host configuration proxy (DHCP) server which determines whether a DHCP message can be unicast directly to a destination mobile station, and a routing engine receiving a communication from said proxy server when said DHCP message cannot be unicast directly to a destination mobile station, said routing engine including a Distribution Table which maintains a list of IP addresses to identify mobile stations requesting IP addresses, and said routing engine causing the unicasting over a radio channel to an address of the destination mobile station as identified by said Distribution Table.

9. The system in accordance with claim 8 wherein said base station further comprises a second routing engine receiving communication from said proxy server when a DHCP message can be unicast directly to a destination mobile station.

10. A system for dynamically assigning IP addresses to mobile stations in a wireless network including a plurality of base stations defining cells into which the mobile stations migrate, each said base station comprising a proxy server intercepting mobile-to-base station requests for an IP address and first and second routing engines for unicasting address messages only to mobile stations requesting an address and wherein said first routing engine receives communication from said proxy server when the IP address can be directly unicast to a requesting mobile station and said second routing engine receives communications from said proxy server when an IP address can not be directly unicast to a requesting mobile station, said second routing engine including a Distribution Table containing a list of IP addresses identifying mobile stations to which an IP address can be unicast.

11. A system for dynamically assigning IP addresses to mobile stations in a wireless network including a plurality of base stations defining cells, a wired network connecting said base stations, and a proxy server in each of said base stations, said proxy server identifying whether a message is received ever the wired network from another base station and discarding said message, or received from a mobile station in the cell of the base station and causing an IP address to be unicast to that mobile station.

12. The system in accordance with claim 11 wherein said proxy server at a base station changes the hops field in received messages to determine whether a message is to be discarded or responded to.

13. The system in accordance with claim 12 wherein the proxy server further includes a Distribution Table which stores a table associating mobile stations with IP addresses and sends an IP address unicast message only to mobile stations listed in the table.

14. A method for dynamically assigning IP addresses to mobile stations in a wireless network comprising the steps of:

receiving at a base station proxy server an address designation message;

determining from a Distribution Table which mobile stations within the range of the base station have requested address information and to which a unicast message can be sent; and invoking a first routing engine when the address designation message cannot be unicast to the intended mobile station in order to direct the message to that mobile station; and invoking a second routing engine when the address designation can be unicast to the intended mobile station, which second routing engine unicasts the message over a radio channel to an address of the designated mobile station.

15. The method of claim 14 wherein the network uses dynamic host configuration proxy (DHCP) signaling.

16. The method of claim 15 wherein the messages have hop fields, and further comprising the steps of receiving at a base station DHCP proxy server an address request message from a mobile station requesting an IP address;

determining if the address request message is directly from the mobile station or from another base station over a wired network segment;

if the address request message is directly from a mobile station, altering the hop field in the address request message and sending it over the wired network segment to an address server;

if the address request message is from another base station, discarding the address request message; and transmitting the address designation message only to those mobile stations identified.

* * * * *

UNITED STATES PATENT AND TRADEMARK OFFICE
CERTIFICATE OF CORRECTION

| | | |
|---|---|---|
| PATENT NO. | : 7,016,353 B2 | Page 1 of 1 |
| APPLICATION NO. | : 09/880530 | |
| DATED | : March 21, 2006 | |
| INVENTOR(S) | : Proctor et al. | |

It is certified that error appears in the above-identified patent and that said Letters Patent is hereby corrected as shown below:

In the Specification

In Column 8, Line 22, delete "hardwave" and insert -- hardware --, therefor.

In Column 8, Line 29, delete "hardwave" and insert -- hardware --, therefor.

In the Claims

In Column 8, Line 58, in Claim 1, delete "(DHCP)" and insert -- (DHCP), --, therefor.

In Column 9, Line 13, in Claim 3, delete "connecting to" and insert -- connecting --, therefor.

In Column 9, Line 64, in Claim 8, delete "including" and insert -- including: --, therefor.

In Column 10, Line 17, in Claim 10, delete "comprising" and insert -- comprising: --, therefor.

In Column 10, Line 36, in Claim 11, delete "ever" and insert -- over --, therefor.

In Column 10, Line 51, in Claim 14, delete "network" and insert -- network, --, therefor.

In Column 11, Line 4, in Claim 16, delete "steps of" and insert -- steps of: --, therefor.

Signed and Sealed this
Eleventh Day of November, 2014

Michelle K. Lee
*Deputy Director of the United States Patent and Trademark Office*